US012273333B2

(12) United States Patent
Agrawal et al.

(10) Patent No.: US 12,273,333 B2
(45) Date of Patent: Apr. 8, 2025

(54) TRANSITIONING INTERACTIONS OF AN INTERACTION SESSION INITIATED WITHIN A METAVERSE TO A REAL-WORLD ENVIRONMENT TO COMPLETE THE INTERACTION SESSION

(71) Applicant: Bank of America Corporation, Charlotte, NC (US)

(72) Inventors: Jatin Agrawal, Clover, SC (US); Heather Dolan, Sarasota, FL (US); Adithya Gadwale, Falls Church, VA (US); Catalina Enciso, Mooresville, NC (US); Akeem Perez, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 240 days.

(21) Appl. No.: 18/169,370

(22) Filed: Feb. 15, 2023

(65) Prior Publication Data

US 2024/0275770 A1    Aug. 15, 2024

(51) Int. Cl.
H04L 9/40    (2022.01)
(52) U.S. Cl.
CPC .................................. H04L 63/08 (2013.01)
(58) Field of Classification Search
CPC ...................................................... H04L 63/08
USPC ............................................................. 726/7
See application file for complete search history.

(56) References Cited

U.S. PATENT DOCUMENTS

| 8,782,757 B2 | 7/2014 | Kavantzas et al. |
| 9,348,929 B2 | 5/2016 | Eberlein |
| 9,448,908 B2 | 9/2016 | Carmi |
| 9,621,606 B2 | 4/2017 | Swenson et al. |
| 10,009,335 B2 | 6/2018 | Mathew et al. |
| 10,235,840 B2 | 3/2019 | Arnone et al. |
| 10,326,667 B2 | 6/2019 | Jones et al. |
| 10,581,610 B2 | 3/2020 | Wang et al. |
| 10,621,653 B2 | 4/2020 | Isaacson et al. |
| 11,494,991 B2 | 11/2022 | Spivack et al. |
| 2006/0015463 A1 | 1/2006 | Gupta et al. |
| 2014/0019523 A1 | 1/2014 | Heymann et al. |
| 2014/0068245 A1 | 3/2014 | Kanekar |
| 2014/0359709 A1 | 12/2014 | Nassar et al. |
| 2017/0085556 A1 | 3/2017 | Mathew et al. |
| 2019/0097995 A1 | 3/2019 | Chickering |

(Continued)

*Primary Examiner* — Benjamin A Kaplan

(57) ABSTRACT

A system for transitioning an interaction session initiated within a metaverse to a real-world environment to complete the interaction session comprises a metaverse server in communication with an entity server. The metaverse server receives an interaction request from an avatar to initiate an interaction session with an entity within a virtual environment. The metaverse server generates an instruction token for a user instruction and a session identifier for the interaction session. The metaverse server obtains a user identity token from the entity and authorizes the avatar to interact with the entity. The metaverse server conducts the first interaction between the avatar and the entity and generates a first interaction token for the first interaction. The entity server validates the user identity token and the first interaction token from the user device in the real-world environment. The entity server conducts a second interaction with the user to complete the interaction session.

20 Claims, 4 Drawing Sheets

(56) References Cited

U.S. PATENT DOCUMENTS

| | | |
|---|---|---|
| 2019/0370185 A1 | 12/2019 | Flynn et al. |
| 2022/0012723 A1 | 1/2022 | Metral |
| 2024/0143721 A1* | 5/2024 | Naik ........................ G06T 13/40 |
| 2024/0146551 A1* | 5/2024 | Wang ..................... H04L 9/3213 |
| 2024/0257101 A1* | 8/2024 | Rai ..................... G06Q 30/0601 |
| 2024/0257466 A1* | 8/2024 | Harsha .................. G06T 17/205 |

* cited by examiner

TRANSITIONING INTERACTIONS OF AN INTERACTION SESSION INITIATED WITHIN A METAVERSE TO A REAL-WORLD ENVIRONMENT TO COMPLETE THE INTERACTION SESSION

TECHNICAL FIELD

The present disclosure relates generally to network communications and information security, and more specifically to a system and method for transitioning an interaction session initiated within a metaverse to a real-world environment to complete the interaction session.

BACKGROUND

A user may operate a user device as an avatar to access a virtual environment to initiate an interaction session for an application service with an entity. If the user needs to complete the interaction session with the entity at a physical geographic location in a real-world environment, current technology does not provide a reliable and effective solution to securely transition the interaction session from the metaverse to the real-world environment to complete the interaction session.

SUMMARY

Conventional technology is not configured to facilitate a user to efficiently and securely transition an interaction session initiated in a virtual environment (e.g., such as a metaverse) to the real-world environment to complete the interaction session. The system described in the present disclosure is particularly integrated into a practical application to transition interactions of an interaction session initiated within the metaverse to a real-world environment to complete the interaction session.

The disclosed system is configured to transition the interaction session from a virtual environment to a real-world environment to complete the interaction session. The metaverse server receives an interaction request from an avatar to initiate an interaction session with an entity within the virtual environment. The avatar is associated with a user and a user device (e.g., augmented reality (AR)/virtual reality (VR) headset). The interaction session may be related to an application or an order to obtain a physical item provided by the entity. The interaction request comprises user credentials and a user instruction for the interaction session. The user instruction for the interaction session may include at least a first interaction and a second interaction between the user and the entity. The avatar may interact with the entity to conduct a virtual interaction indicative of a first interaction in the virtual environment. The user may interact with the entity in a physical geographic location to conduct the second interaction with the entity to complete the interaction session and obtain the physical item.

In one embodiment, a system for transitioning an interaction session initiated within a metaverse to a real-world environment to complete the interaction session comprises a metaverse server in communication with an entity server. A metaverse server is configured to receive an interaction request from an avatar to initiate an interaction session with an entity within a virtual environment. The interaction request comprises user credentials and a user instruction to perform a particular interaction. The avatar is associated with a user device associated with a user. The metaverse server generates an instruction token associated with the user instruction and a session identifier associated with the interaction session. The instruction token is associated with the session identifier. The user instruction for the interaction session comprises at least a first interaction and a second interaction based on the user instruction. The metaverse server verifies with an entity that an identity of the avatar is associated with the user to obtain a user identity token from the entity server based at least in part upon the user credentials and a user profile stored in a memory of the entity server. The entity server is configured to determine whether the user credentials from the metaverse server match data of a user profile stored in the memory of the entity server. In response to determining that the user credentials match the data of the user profile stored in the memory of the entity server, the entity server sends the user identity token to the metaverse server and validates the identity of the avatar associated with the user. The user identity token is stored in the memory of the entity server. The metaverse server sends the user identity token to the user device to authorize the avatar to interact with the entity.

The metaverse server conducts a virtual interaction based on the user instruction and the user identity token. The virtual interaction is indicative of the first interaction of the interaction session between the avatar and the entity in the virtual environment. The metaverse server generates a first interaction token associated with the first interaction. The metaverse server sends to the user device the first interaction token associated with the user identity token and the session identifier. The metaverse server sends to the entity server the session identifier, the user identity token, the instruction token, and the first interaction token. Further, the entity server receives the user identity token and the first interaction token from the user device in a real-world environment. The entity server validates the user identity token from the user device by determining whether the user identity token from the user device matches the user identity token stored in the memory of the entity server. In response to determining a match, the entity server retrieves the session identifier, the instruction token, and the first interaction token from the memory of the entity server based on the user identity token and the first interaction token. The entity server identifies the second interaction to be completed based on the first interaction token and the instruction token. The entity server conducts the second interaction with the user to complete the interaction session in the real-world environment. Further, the entity server generates a second interaction token embedded with second interaction data. The entity server generates a completion token indicating a completeness of the interaction session. The entity server sends the completion token and the second interaction token to the metaverse server. The metaverse server updates a session status indicator to indicate that the interaction session is completed.

The system described in the present disclosure is particularly integrated into a practical application and provides technical solutions of transitioning interactions of an interaction session initiated within the metaverse to a real-world environment to complete the interaction session. The practical application provides a reliable and effective solution to implement a seamless transition of an interaction session from the virtual environment and the real-world environment. The practical application is implemented by generating corresponding tokens to represent a user request, a user identity, interactions, an interaction status. For example, the entity server may verify an identity of the avatar is associated with the user and generate a user identity token. The user identity token is used to authorize the avatar to interact with the entity for a virtual interaction within the virtual environment. Further, the entity server validates that the user identity token received from the user device in a real-world environment matches the user identity token stored in the memory of the entity server. The entity server retrieves the data associated with the user identity token and the interaction session from the memory of the entity server. The user identity token is further used to authorize the user to interact with the entity in a real-world environment. The metaverse server and the entity server communicate with each other and update interaction tokens corresponding to interaction information in the virtual environment and the real-world environment to ensure that the interaction session is completed securely and efficiently. After the avatar interacts with the entity for applying for a physical item in the virtual environment, the user may use the user identity token and the first interaction token to interact with the entity in the real-world environment to complete the interaction session and obtain the physical item. The underlying computing device in the real-world environment does not need to perform additional processing which was completed in the virtual environment. The practical application, in turn, improves the performance and underlying operation of the disclosed system and reduces networking resources and data transmission in the network. The practical application reduces usage of network bandwidth necessitated by repeated interaction requests from computing devices and further alleviates network bottlenecks. In this way, the practical application provides a reliable and effective solution to transition an interaction session initiated in a virtual environment to the real-world environment to complete the interaction session.

These practical applications lead to technical advantage of improving application service security and efficiency to the overall computer system. For example, the system generates a user identify token, a session identifier and interaction tokens associated with the virtual interactions in the virtual environment. The user may use the user device with the user identify token and the interaction token to interact with the entity located in different geographical areas in the real-world environment to complete the interaction session. By using the user identity token along with the interaction session token and interaction tokens to identify and verify the identity of the user associated with corresponding interactions, the interaction session can be reliably and securely completed in real-world environment even though it was started in the virtual environment. Further, the entity server communicates the metaverse server with the interaction tokens and a completion token generated in the real-world environment so that both the metaverse server and the entity server store a whole session data of a completed interaction session. Thus, different interactions occurred in both the virtual environment and the real-world environment are compatible with a user identity and user profile information.

The disclosed system seamlessly transitions the interactions of the interaction session initiated in the virtual environment to the real-world environment to complete the interaction session. The disclosed system improves interaction efficiency and user experience to securely implement an interaction session. The disclosed system further improves user experience and saves interaction processing time to complete the interaction session. Thus, the disclosed system improves computer system security, system compatibility, and interaction operation efficiency of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies fail to provide efficient and reliable solutions to facilitate a user to initiate an interaction session within a virtual environment and complete the interaction session in a real-world environment. This disclosure presents a system for transitioning an interaction session initiated within a metaverse to a real-world environment to complete the interaction session by referring to FIGS. 1 through 3A-3B.

System Overview

Figure 1:
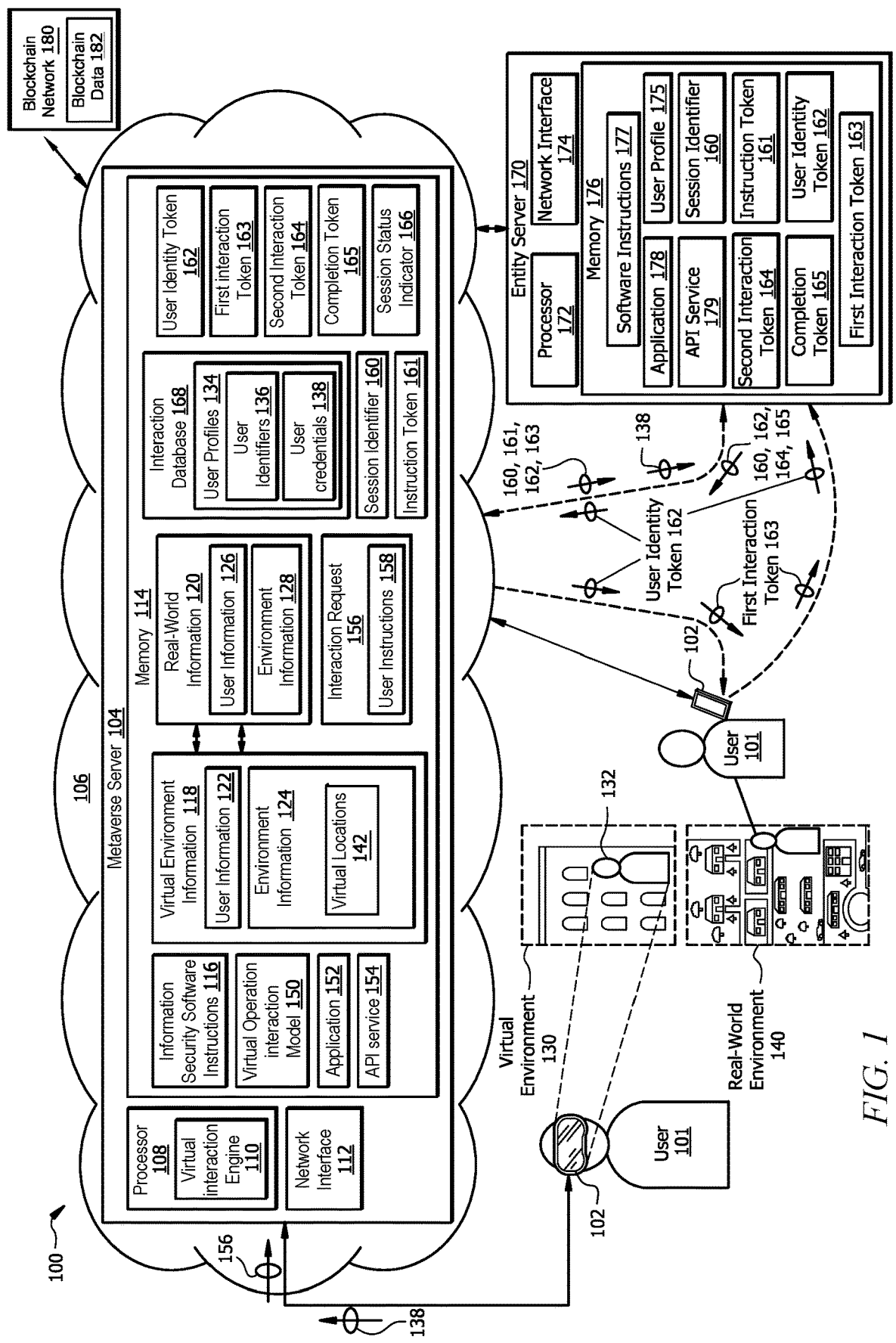
FIG. 1 illustrates an embodiment of a system configured to transition an interaction session initiated within a virtual environment to a real-world environment to complete the interaction session.

FIG. 1 illustrates one embodiment of a system 100 that is configured to transition an interaction session initiated within a virtual environment 130 to a real-world environment 140 to complete the interaction session. In one embodiment, system 100 comprises a metaverse server 104, one or more user devices 102, an entity server 170, a blockchain network 180, and a network 106. Network 106 enables the communication between components of the system 100. Metaverse server 104 comprises a processor 108 in signal communication with a memory 114. Memory 114 stores information security software instructions 116 that when executed by the metaverse server 104, cause the metaverse server 104 to execute one or more functions described herein. Entity server 170 comprises a processor 172 in signal communication with a memory 176. Memory 176 stores software instructions 177 that when executed by the processor 172, cause the processor 172 to execute one or more functions described herein. The blockchain network 180 is a public blockchain network which may be referred to a distributed database shared by a plurality of computing devices in the network 106. The system 100 transmits data between metaverse server 104, one or more user devices 102, entity server 170, and/or the blockchain network 180 through the network 106.

In some embodiments, the system 100 may be implemented by the metaverse server 104 and the entity server 170 to transition an interaction session initiated within a virtual environment 130 to a real-world environment 140 to complete the interaction session between a user and an entity. The interaction session with the entity may be related to an application or an order to obtain a physical item provided by the entity. The metaverse server 104 generates a set of security tokens associated with a user identity and corresponding virtual interactions of the interaction session. The entity server 170 uses the set of the security tokens in the real-world environment 140 to identify the user identify and obtain data of the virtual interactions to complete the interaction session. In one embodiment, the metaverse server 104 may receive an interaction request 156 from the avatar 132 to initiate an interaction session with an entity within the virtual environment 130. The avatar 132 is associated with a user device 102 (e.g., augmented reality (AR)/virtual reality (VR) headset) associated with a user 101. The interaction request 156 includes user credentials 138 and a user instruction 158 to conduct the interaction session with the entity. The user credentials are used to authorize a user 101 with a user device 102 to interact with the entity. The metaverse server 104 may generate a session identifier 160 associated with the interaction session. The metaverse server 104 may generate an instruction token 161 associated with the user instruction 158.

The metaverse server 104 may verify with the entity that an identity of the avatar 132 is associated with the user 101. For example, the metaverse server 104 sends the user credentials 138 from the avatar 132 to the entity server 170 associated with the entity. The entity server 170 may determine that the user credentials 138 match data of a user profile 175 stored in the memory 176 of the entity server 170. The entity server 170 may send a user identity token 162 to the metaverse server 104. The entity server 170 may store the user identity token 162 in the memory 176 of the entity server 170. The metaverse server 104 obtains the user identity token 162 from the entity server 170 and authorizes the avatar 132 to interact with the entity in the virtual environment 130.

The metaverse server 104 conducts a virtual interaction indicative of a first interaction of the interaction session between the avatar 132 and the entity based on the user instruction 158. The metaverse server 104 may generate a first interaction token 163 associated with the first interaction. The metaverse server 104 may generate a session status indicator 166 to indicate whether the interaction session is completed. The metaverse server 104 may send the first interaction token 163 associated with the user identity token 162 and the session identifier 160 to the user device 102. Each token is embedded with the corresponding information and associated with each other. The metaverse server 104 may send the data associated with the session identifier 160, the instruction token 161, the user identity token 162, and the first interaction token 163 to the entity server 170 via the network 106.

Further, the entity server 170 may receive the user identity token 162 and the first interaction token 163 from the user device 102 associated with the user 101 at a physical geographic location in the real-world environment 140. The entity server 170 may determine that the user identity token 162 from the user device 102 matches the user identity token 162 stored in the memory 176 of the entity server 170. The entity server 170 retrieves data associated with the session identifier 160 and the user identity token 162 stored in the memory 176 of the entity server 170. The entity server 170 may conduct a second interaction with the user 101 based on the instruction token 161 associated with the user instruction 158. The entity server 170 generates a second interaction token 164 comprising second interaction data. The entity server 170 may complete the interaction session in the real-world environment 140. The entity server 170 may generate a completion token 165 indicating a completeness of the interaction session. The entity server 170 may send the completion token 165 and the second interaction token 164 associated with the session identifier 160 and the user identity token 162 to the metaverse server 104. The metaverse server 104 may update a session status indicator 166 to indicate that the interaction session is completed.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality (VR) device, an augmented reality (AR) device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Within the virtual environment 130, each user may be associated with a user device 102 and an avatar 132. An avatar 132 is a graphical representation of the user device 102 associated with the user and the user profile 134 within the virtual environment 130. Examples of the avatars 132 include, but are not limited to, a person, an animal, or an object. In some embodiments, the features and characteristics of the avatar 132 may be customizable and user defined. By using the avatar 132, a user or the user device 102 can move within the virtual environment 130 to interact with an entity associated with the metaverse server 104 or other avatars 132 and objects within the virtual environment 130.

Figure 2:
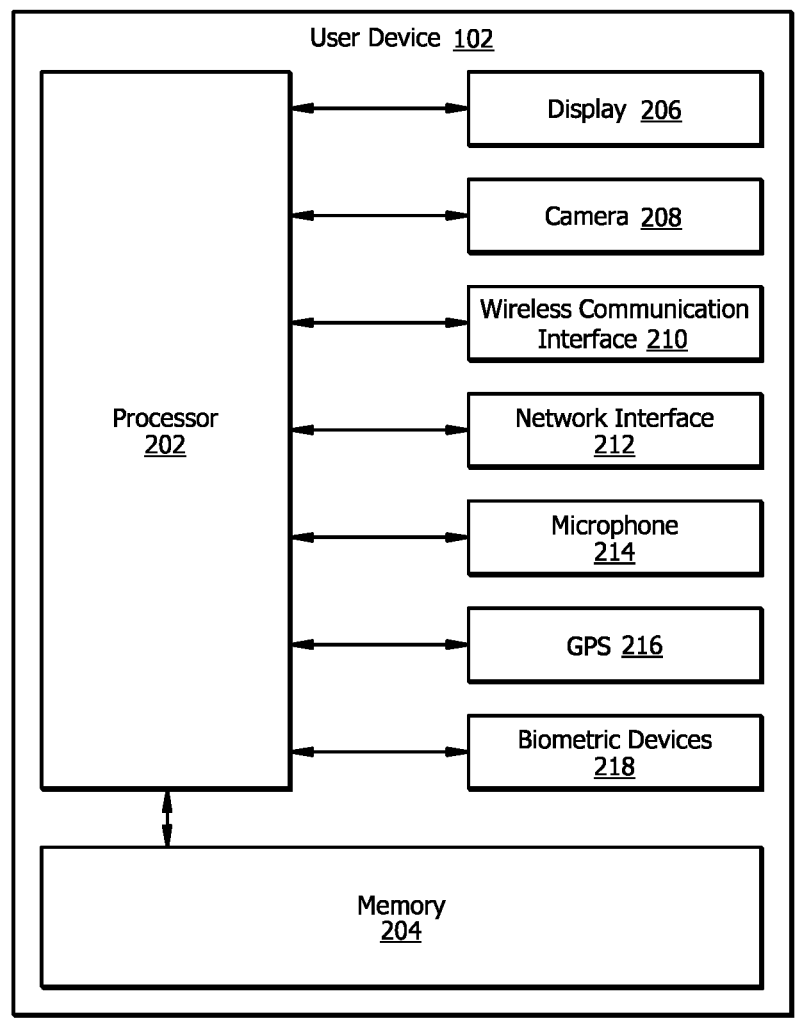
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the metaverse server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3A-3B. For example, processor 202 may be configured to display virtual objects on display 206, detect user location, identify virtual sub, capture biometric information of a user, via one or more camera 208, microphone 214, and/or biometric devices 218, and communicate via wireless communication interface 210 with a metaverse server 104, an entity server 170, and/or other user devices 102.

Memory 204 is operable to store any of the information described with respect to FIGS. 1 and 3 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution. In some embodiments, the memory 204 may store and/or include a browser or web application for a user device 102 to interact with the entity, such as, for example, to access application services (e.g., application 152) provided by the metaverse server 104 in the virtual environment 130.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. For example, camera 208 may be configured to receive a command from the user to capture images and form a video stream. Wireless communication interface 210 is configured to facilitate processor 202 in communicating with other devices. Wireless communication interface 210 is configured to employ any suitable communication protocol. Network interface 212 may be configured to use any suitable type of communication protocol and enable wired and/or wireless communications. Microphone 214 is configured to capture audio signals (e.g., voice signals or commands) from a user 101. GPS sensor 216 is configured to capture and to provide geographical location information. For example, GPS sensor 216 is configured to provide a geographic location of a user device 102 associated with a user 101. Biometric devices 218 are configured to capture information about a person's physical characteristics and to output a biometric signal based on captured information. Examples of biometric devices 218 may include, but are not limited to, retina scanners and fingerprint scanners.

Metaverse Server

Referring to FIG. 1, the metaverse server 104 is a hardware device that is generally configured to provide services and software and/or hardware resources to user devices 102. The metaverse server 104 is generally a server, or any other device configured to process data and communicate with the entity server 170 and user devices 102 via the network 106. The metaverse server 104 is generally configured to oversee the operations of a virtual interaction engine 110, as described further below in conjunction with the operational flows of a method 300 described in FIGS. 3A-3B. In some embodiments, the metaverse server 104 may be implemented in the cloud or may be organized in either a centralized or distributed manner.

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from the memory 114 and executes them by directing the coordinated operations of the ALU, registers and other components. The processor 108 may be a special-purpose computer designed to implement the functions disclosed herein.

In an embodiment, the virtual interaction engine 110 is implemented using logic units, FPGAs, ASICs, DSPs, or any other suitable hardware. The virtual interaction engine 110 may be configured to perform operations of the method 300 as described in FIGS. 3A-3B. For example, the virtual interaction engine 110 may be configured to facilitate the avatar 132 to conduct interactions with an entity within a virtual environment 130.

The memory 114 stores any of the information described above with respect to FIGS. 1 and 3A-3B along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116 which may comprise any suitable set of instructions, logic, rules, or code operable to execute the virtual interaction engine 110. Virtual interaction engine 110 may include, but is not limited to, one or more separate and independent software and/or hardware components of a metaverse server 104. In an example operation, the memory 114 may store a virtual operation interaction model 150, an application 152, an application programming interface (API) service 154, and other program models which executed by the processor 108 to implement operational flows of the system of FIG. 1. The application 152 may be a metaverse application associated with an entity that provides application services to an avatar 132 associated with a user 101 and a user device 102 in a virtual environment 130.

Database 168 (e.g., interaction database 168) may be a remote database, a cloud database, or an on-site internal database. Database 168 may be coupled to or in communication with and accessed by the metaverse server 104 via the network 106. As illustrated in FIG. 1, the database 168 is an internal database and stores information including user profiles 134, user identifiers 136, user credentials 138, an interaction request 156 with a user instruction 158, a session identifier 160, an instruction token 161, a user identity token 162, a first interaction token 163, a second interaction token 164, a completion token 165, and a session status indicator 166.

A user profile 134 may include a user identifier 136 and user credentials 138. The user credentials associated with a user is registered with the entity in the real-world environment 140. The user identifier 136 represents a user identity and is associated with the user credentials 138 and user interactions which are stored in the memory 114 of the metaverse server 104. A user profile 134 further includes a physical address, email address, phone number, and any other data, such as documents, files, media items, etc. The plurality of user profiles 134 may be stored by the processor 108 in the memory 114.

The virtual environment information 118 comprises user information 122 and environment information 124. The user information 122 generally comprises information that is associated with any user profiles 134 associated with user accounts that can be used within a virtual environment 130. The environment information 124 includes data of a virtual environment 130 corresponding to one or more virtual locations 142. For example, user information 122 may comprise user profile information, online account information, digital assets information, or any other suitable type of information that is associated with a user 101 within a virtual environment 130. The environment information 124 generally comprises information about the appearance of a virtual environment 130. For example, the environment information 124 may comprise information associated with objects, landmarks, buildings, structures, avatars 132, virtual environment 130, or any other suitable type of element that is present within a virtual environment 130. In some embodiments, the environment information 124 may be used to create a representation of a virtual environment 130 for users 101. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130.

The real-world information 120 comprises user information 126 and environment information 128 of the real-world environment 140. The user information 126 generally comprises information that is associated with user profiles 134 and user accounts that can be used within the real world. For example, user information 126 may comprise user profile information, account information, or any other suitable type of information that is associated with a user within a real-world environment 140. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the metaverse server 104 has access to both the virtual environment information 118 and the real-world information 120, the metaverse server 104 may link the virtual environment information 118 and the real-world information 120 together for a user 101 such that changes to the virtual environment information 118 affect or propagate to the real-world information 120 of the real-world environment 140 and vice-versa. The metaverse server 104 may be configured to store one or more maps that translate or convert different types of interactions between the real-world environment 140 and the virtual environment 130 and vice-versa.

The metaverse server 104 may generate a virtual environment 130 based on the virtual environment information 118 and the real-world information 120 of the real-world environment 140. In some embodiments, the virtual environment 130 may be a metaverse branch of the entity. In one embodiment, the virtual environment 130 represents an entity at different physical geographic locations in the real-world environment 140. The metaverse server 104 may be configured to store one or more maps executed by the processor 108 that translate or convert different types of interactions occurred in and between the virtual environment 130 and the real-world environment 140.

Within the virtual environment 130, an avatar 132 is generated by the processor 108 as a graphical representation of a user device 102 within the virtual environment 130. The avatar 132 includes a plurality of features and characteristics which are processed by the processor 108 to present the avatar 132 as the graphical representation of a user device 102 in the virtual environment 130. For example, the metaverse server 104 may receive a signal indicating a physical geographic location of the user device 102 and/or detect the user device 102 in the real-world environment 140. The metaverse server 104 may store the received signal in the memory 114. The metaverse server 104 may determine a virtual location 142 of the avatar 132 associated with the user device 102 in the virtual environment 130 based on the physical geographic location of the user device 102. The metaverse server 104 may obtain the environment information 124 and environment information 128 associated with the virtual location 142 and the physical geographic location of the user device 102 in the real-world environment 140. The metaverse server 104 may generate and present an avatar 132 in the virtual environment 130 based on the obtained environment information 124 and environment information 128. By using the user device 102, the avatar 132 can move or maneuver and interact with entities, other avatars, and objects within the virtual environment 130.

Network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Entity Server

Referring to FIG. 1, the entity server 170 is generally a server, or any other device configured to provide services and software and/or hardware resources to the metaverse server 104 and user devices 102, etc., via the network 106.

The entity server 170 includes a memory 176 and a processor 172 operably coupled to the memory 176. The entity server 170 is generally a server, or any other device configured to process data and communicate with user devices 102 via the network 106. The entity server 170 is generally configured to perform the operations as described further below in conjunction with the operations as described in FIGS. 3A-3B. The memory 176 stores any of the information described above with respect to FIGS. 1 and 3A-3B along with any other data, instructions, logic, rules, or code operable to implement the function(s) described herein when executed by the processor 172.

The memory 176 is operable to store software instructions 177 which may comprise any suitable set of instructions, logic, rules, or code operable to execute operations as described further below in conjunction with the operations as described in FIGS. 3A-3B. In an example operation, the memory 176 may store an application 178, an application programming interface (API) service 179, and other program models which executed by the processor 172 to implement operational flows of the system of FIGS. 1 and 3A-3B. The application 178 may be an application associated with an entity that provides application services to user devices 102 associated with users 101 in a real-world environment 140. The memory 176 may be operable to store a user profile 175, a session identifier 160, an instruction token 161, a user identity token 162, a first interaction token 163, a second interaction token 164, and a completion token 165.

The entity server 170 may include a network interface 174 which is configured to enable wired and/or wireless communications (e.g., via network 106). The network interface 174 may be configured to communicate data between the entity server 170 and the user device 102, databases, systems, or domains. For example, the network interface 174 may comprise a WIFI interface, a local area network (LAN) interface, a wide area network (WAN) interface, a modem, a switch, or a router. The processor 172 is configured to send and receive data using the network interface 174. The network interface 174 may be configured to use any suitable type of communication protocol as would be appreciated by one of ordinary skill in the art.

Virtual Interaction Engine

In some embodiments, the virtual interaction engine 110 may be implemented by the processor 108 by executing the information security software instructions 116 to create a virtual environment 130, detect a user device 102 associated with a user 101, and generate an avatar 132 associated with the user device 102 and the user 101 in the virtual environment 130.

The virtual interaction engine 110 may be implemented by the processor 108 to execute a virtual operation interaction model 150 to receive an interaction request 156 from an avatar 132. The virtual interaction engine 110 may be implemented by the processor 108 to verify with the entity that an identity of the avatar 132 is associated with the user 101 and the user device 102. The virtual interaction engine 110 may be implemented by the processor 108 to authorize the avatar 132 to interact with the entity and conduct virtual interactions in the virtual environment 130. The virtual interaction engine 110 may be implemented by the processor 108 to generate a set of security tokens associated with virtual interactions occurred in the virtual environment 130. The set of security tokens may be associated with a user identity, an interaction session, and corresponding interactions between the avatar 132 and the entity in virtual environment 130. Each security token may include a random number or a random alphanumeric string. The security token may represent an access key (e.g., password) for authorizing the avatar 132, the user 101 and the user device 102 to access any information associated with the user identity and corresponding interactions. In some embodiments, the security token may not be altered or otherwise changed. In some embodiments, each security token may be used to prevent unauthorized access to the user profile 134, interaction data and the user device 102.

The virtual interaction engine 110 may be implemented by the processor 108 to transition the interactions occurred in the virtual environment 130 to the entity server 170 in a real-world environment 140 to complete the interaction session. The operation of the system 100 is described in FIGS. 3A-3B below.

Initiate an Interaction Session in a Virtual Environment

The metaverse server 104 may identify an avatar 132 associated with a user 101 and a user device 102 entering in the virtual environment 130. The virtual environment 130 may be a metaverse branch of an entity associated with an entity server 170 in the real-world environment 140. The metaverse server 104 may receive an interaction request 156 from the avatar 132 to initiate an interaction session with an entity within the virtual environment 130. The interaction request 156 includes user credentials 138 and a user instruction 158 to conduct the interaction session with the entity. The user credentials 138 are used to authorize a user 101 with a user device 102 to interact with the entity in the virtual environment 130 and a real-world environment 140. The user instruction 158 may be related to an application or an order to obtain a physical item provided by the entity. The metaverse server 104 may generate a session identifier 160 associated with the interaction session. The metaverse server 104 may generate an instruction token 161 associated with the user instruction 158.

The interaction session associated with the user instruction 158 may include a plurality of interactions between the user 101 and the entity based on the user instruction 158. In some embodiments, the interaction session associated with the user instruction 158 includes at least a first interaction and a second interaction between the user 101 and the entity. For example, the avatar 132 may conduct a virtual interaction indicative of a first interaction to interact with the entity in the virtual environment 130. The user 101 may interact with the entity at a physical geographic location in the real-world environment 140 to conduct the second interaction with the entity to complete the interaction session and obtain the physical item.

Validate an Identify of an Avatar with an Entity and Authorize the Avatar to Interact with the Entity in the Virtual Environment In some embodiments, the metaverse server 104 may verify with the entity that an identity of the avatar 132 is associated with the user 101 in order to authorize the avatar 132 to interact with the entity. In one embodiment, the metaverse server 104 sends the user credentials 138 from the avatar 132 to the entity server 170 associated with the entity. The entity server 170 receives the user credentials 138 from the metaverse server 104. The entity server 170 may determine whether the user credentials 138 match data of a user profile 175 stored in the memory 176 of the entity server 170. In response to determining a match, the entity server 170 may generate a user identity token 162 to authorize the avatar 132 and the user 101 to interact with the entity. The entity server 170 may store the user identity token 162 in the memory 176 of the entity server 170. The entity server 170 validates the identity of the avatar 132 associated with the user 101 and sends the user identity token 162 to the metaverse server 104.

The metaverse server 104 obtains the user identity token 162 from the entity server 170 and sends the user identity token 162 to the user device 102 to authorize the avatar 132 to interact with the entity in the virtual environment 130.

Conduct Virtual Interactions of an Interaction Session in the Virtual Environment Based on the user instruction 158 and the user identity token 162, the metaverse server 104 may conduct one or more virtual interactions between the avatar 132 and the entity associated with an entity server 170 based on the user instruction 158 in the virtual environment 130. For example, the metaverse server 104 conducts a virtual interaction of the interaction session between the avatar 132 and the entity. The virtual interaction may be indicative of the first interaction of the interaction session. The metaverse server 104 may generate a first interaction token 163 associated with the first interaction. The metaverse server 104 may generate a session status indicator 166 to indicate whether the interaction session is completed. The first interaction token 163 includes or is embedded with first interaction data including one or more of textual data, audio data, or video data. The metaverse server 104 may send the data associated with the interaction session to the entity server 170 via the network 106. The data associated with the interaction session includes the session identifier 160, the instruction token 161, the user identity token 162, the first interaction token 163, and the session status indicator 166. The metaverse server 104 may generate associations between the session identifier 160, the instruction token 161, the user identity token 162, the first interaction token 163, and the session status indicator 166. For example, the metaverse server 104 may send the session identifier 160, instruction token 161, and the first interaction token 163 associated with the user identity token 162 to the user device 102.

In one embodiment, the metaverse server 104 may associate the user identity token 162 with the session identifier 160, the first interaction token 163, and other tokens in a quick response (QR) code or any other scan-able and computer readable codes which may be linked to the interaction session and corresponding interactions.

In one embodiment, the metaverse server 104 may generate blockchain data 182 of the interaction session in a blockchain and store the blockchain data 182 in a blockchain network 180. The blockchain data 182 may include the session identifier 160, the instruction token 161, the user identity token 162, the first interaction token 163, and a session status indicator 166 associated with the virtual interaction of the interaction session. The blockchain network 180 may be configured to distribute user interaction information associated with the avatar 132, the user 101, the user device 102, and the entity.

Validate and Confirm Virtual Interactions Associated with an Identify of a User

The entity server 170 receives the data of the interaction session from the metaverse server 104. The entity server 170 may verify and confirm the received data associated with the interaction session is associated with the user identify token 162 stored in the memory 176 of the entity server 170.

For example, the entity server 170 may receive the session identifier 160, the instruction token 161, the user identity token 162, and a first interaction tokens 163 associated with the first interaction. The entity server 170 may validate that the data associated with the interaction session matches the user identity token 162 stored in the memory 176 of the entity server 170. In one embodiment, the entity server 170 determines that the user identity token 162 received in the data associated with the interaction session matches the user identity token 162 stored in the memory 176 of the entity server 170. The entity server 170 may confirm with the metaverse server 104 that the data of associated with the interaction session matches the user identity token 162 and is validated. The entity server 170 may store the data of the interaction session and associated the data with the user identity token 162 in the user profile 175 in the memory 176 of the entity server 170.

In one embodiment, the metaverse server 104 may send the session identifier 160, the instruction token 161, the user identity token 162, the first interaction token 163 to the entity server 170. Each token is embedded with corresponding information. The entity server 170 may verify and confirm the received tokens and the related information are associated with the user identify token 162 stored in the memory 176 of the entity server 170.

In one embodiment, the entity server 170 may access a public blockchain network 180 based on the user identity token 162 via the network 106 to obtain a session identifier 160 and the associated interaction data to be completed in the real-world environment 140. For example, the metaverse server 104 may use a background application programming interface (API) service 179 via the network 106 to access the public blockchain network 180. The entity server 170 may use the user identity token 162 to query an underlying blockchain to obtain a session identifier 160, an instruction token 161, a first interaction token 163, and the session status indicator 166. The entity server 170 may update the blockchain data 182 with a completion token 165 and the second interaction token 164 generated in the real-world environment 140. The entity server 170 may send the completion token 165 and the second interaction token 164 to the metaverse server 104 to indicate that a completion of the interaction session in the real-world environment 140.

Validate an Identify Token and Complete the Interaction Session in the Real-World Environment The user 101 may interact with the entity in a real-world environment 140 associated with the entity to complete the interaction session. The entity server 170 may receive the user identity token 162 and the first interaction token 163 from the user device 102 associated with the user 101 in the real-world environment 140 at a physical geographic location. For example, the entity server 170 may detect the user identity token 162 presented by the user device 102. The entity server 170 may detect both the user identity token 162 and the first interaction token 163 presented by the user device 102. In one embodiment, the entity server 170 may determine that the user identity token 162 from the user device 102 matches the user identity token 162 stored in the memory 176 of the entity server 170. The entity server 170 retrieves data associated with the user identity token 162 and the first interaction token 163 stored in the memory 176 of the entity server 170. The entity server 170 may retrieves the session identifier 160 and the instruction token 161 associated with the user identity token 162 from the memory 176 of the entity server 170. The entity server 170 identifies the second interaction to be completed in the real-world environment 140 based on the instruction token 161 and the first interaction token 163.

The entity server 170 may conduct the second interaction with the user device 102 associated with the user 101 to complete the interaction session in the real-world environment 140. The entity server 170 may complete the interaction session in the geographical location in the real-world environment 140. The geographical location in the real-world environment 140 may be different from a location associated with a metaverse branch of the entity in the virtual environment 130. In some embodiment, the user may choose different geographical locations associated with the entity in the real-world environment 140 to complete the interaction session.

The entity server 170 generates a second interaction token 164 embedded with second interaction data. The entity server 170 may generate a completion token 165 indicating a completeness of the interaction session in the real-world environment 140. The entity server 170 may present the completion token 165 to the user device 102. The completion token 165 and the second interaction token 164 are associated with the user identity token 162 and the session identifier 160.

Complete Transitioning Interactions of an Interaction Session Initiated within a Metaverse to a Real-World Environment The entity server 170 may send the completion token 165 and the second interaction token 164 with the session identifier 160 and the user identity token 162 to the metaverse server 104. The metaverse server 104 may associate the session identifier 160 with the completion token 165 and the second interaction token 164 generated in the real-world environment 140. The metaverse server 104 may update a session status indicator 166 to indicate that the interaction session is completed.

In some embodiments, the metaverse server 104 may update the blockchain data 182 of the interaction session associated with the session identifier 160 in the blockchain with a completion token 165 and a second interaction token 164 associated with the second interaction of the interaction session conducted in the real-world environment 140. The operations of the system 100 are described in FIGS. 3A-3B below.

Figure 3A:
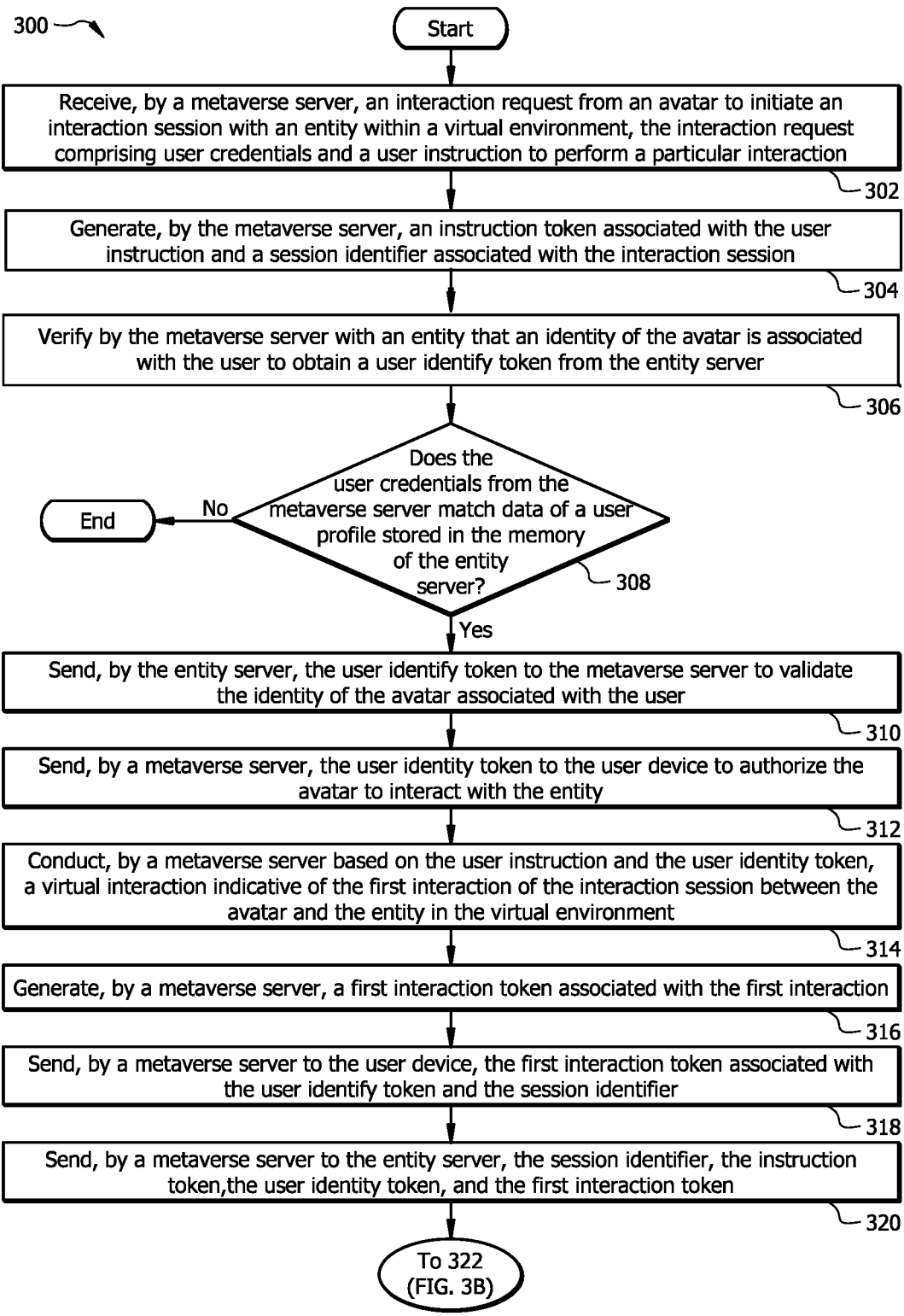
FIGS. 3A-3B illustrate an example operational flow of a method for transitioning the interaction session initiated within the virtual environment to the real-world environment to complete the interaction session.
Figure 3B:
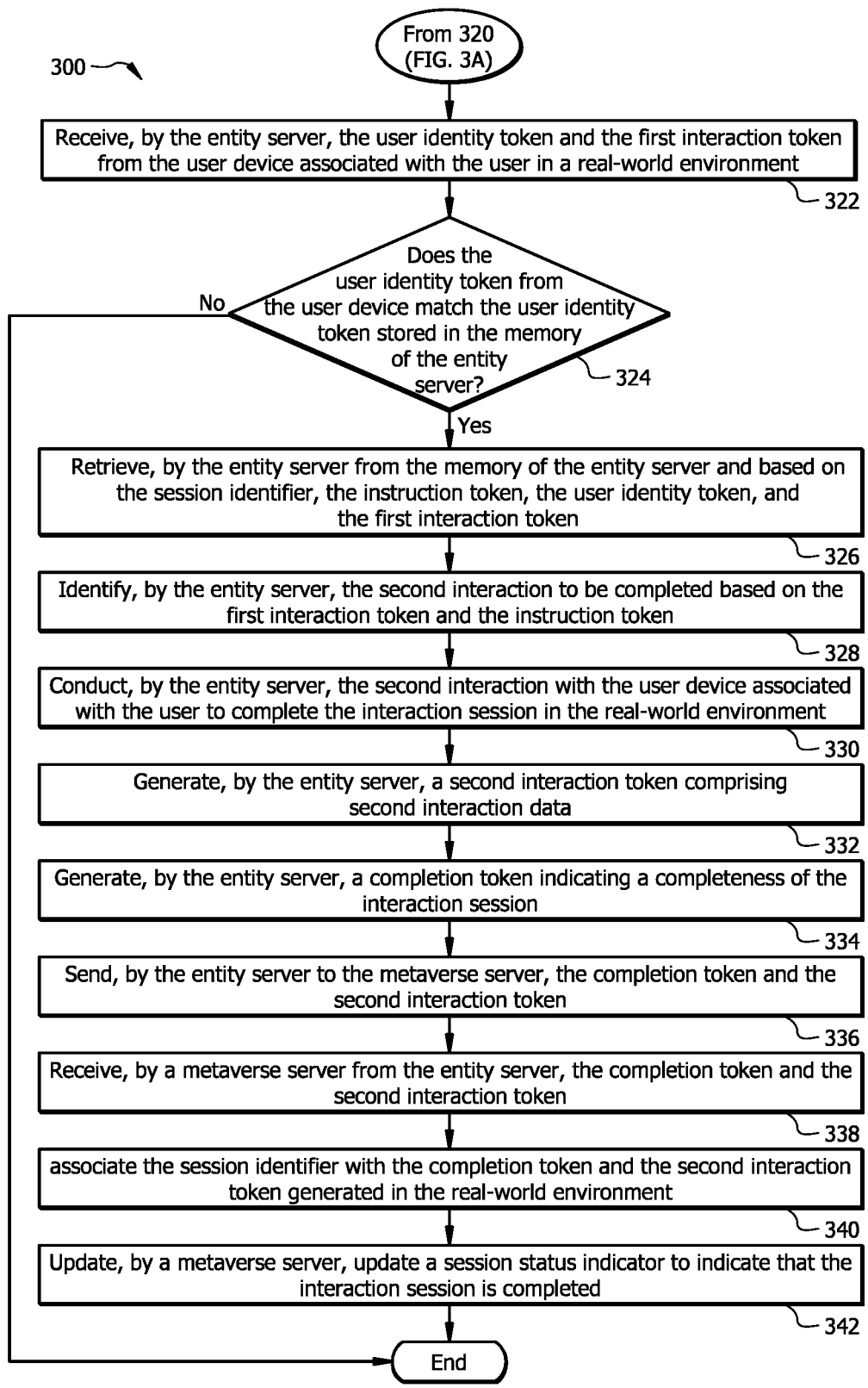

Example Operational Flow for Transitioning Interactions of an Interaction Session Initiated within a Virtual Environment to a Real-World Environment to Complete the Interaction Session FIGS. 3A-3B provide an example operational flow of a method 300 of transitioning interactions of an interaction session initiated within a virtual environment 130 to a real-world environment 140 to complete the interaction session. Modifications, additions, or omissions may be made to method 300. Method 300 may include more, fewer, or other operations. For example, operations may be performed by the metaverse server 104 and the entity server 170 in parallel or in any suitable order. While at times discussed as the system 100, processor 108, processor 172, virtual interaction engine 110, information security software instructions 116, software instructions 177, or components of any of thereof performing operations, any suitable system or components of the system 100 may perform one or more operations of the method 300. For example, one or more operations of method 300 may be implemented, at least by metaverse server 104 and the entity server 170 to perform operations 302-342.

The method 300 begins at operation 302 where the metaverse server 104 receives an interaction request 156 from an avatar 132 to initiate an interaction session with an entity within a virtual environment 130. The metaverse server 104 may in communication with an entity server 170 via a network 106. The interaction request 156 includes user credentials 138 and a user instruction 158 for the interaction session. The avatar 132 is associated with a user device 102 associated with a user 101;

At operation 304, the metaverse server 104 generates an instruction token 161 associated with the user instruction 158 and a session identifier 160 associated with the interaction session. The instruction token 161 is associated with the session identifier 160. The user instruction 158 for the interaction session comprises at least a first interaction and a second interaction based on the user instruction 158.

At operation 306, the metaverse server 104 verifies with an entity that an identity of the avatar 132 is associated with the user 101 to obtain a user identity token 162 from the entity server 170. The verifying process is performed by the entity server 170 based at least in part upon the user credentials 138 and a user profile 175 stored in a memory 176 of the entity server 170;

At operation 308, the entity server 170 determines whether the user credentials 138 from the metaverse server 104 match data of the user profile 175 stored in the memory 176 of the entity server 170. The data of the user profile 175 stored in the memory 176 of the entity server 170 comprises user credentials 138 associated with the user 101.

At operation 310, the entity server 170 sends the user identity token 162 to the metaverse server 104 and validates the identity of the avatar 132 associated with the user 101 in response to determining that the user credentials 138 match the data of the user profile 175 stored in the memory 176 of the entity server 170.

At operation 312, the metaverse server 104 sends the user identity token 162 to the user device 102 to authorize the avatar 132 to interact with the entity.

At operation 314, the metaverse server 104 conducts a virtual interaction indicative of the first interaction between the avatar 132 and the entity in the virtual environment 130 based on the user instruction 158 and the user identity token 162. The virtual interaction is indicative of the first interaction of the interaction session between the avatar 132 and the entity in the virtual environment 130.

At operation 316, the metaverse server 104 generates a first interaction token 163 associated with the first interaction.

At operation 318, the metaverse server 104 sends the first interaction token 163 associated with the user identity token 162 and the session identifier 160 to the user device 102.

At operation 320, after the first interaction is completed in the virtual environment 130, the metaverse server 104 sends the session identifier 160, the instruction token 161, the user identity token 162, and the first interaction token 163 to the entity server 170.

The user device 102 associated with the user 101 receives the user identity token 162 and the first interaction token 163 from the metaverse server 104. The user 101 may use the user identity token 162 and the first interaction token 163 to complete the interaction session with the entity at a physical location in a real-world environment 140. For example, the user 101 visits the entity at a physical location in the real-world environment 140 a day after the user 101 completes the first interaction with the entity in the virtual environment 130. The user 101 may present the user identity token 162 and the first interaction token 163 shown on a display 206 of the user device 102 to the entity at physical location in the real-world environment 140.

At operation 322, the entity server 170 receives the user identity token 162 and the first interaction token 163 from the user device 102 associated with the user 101 in the real-world environment 140. At operation 324, the entity server 170 validates the user identity token 162 from the user device 102 associated with the user 101 by determining whether the user identity token 162 from the user device 102 matches the user identity token 162 stored in the memory 176 of the entity server 170.

At operation 326, in response to determining a match, the entity server 170 retrieves the session identifier 160, the instruction token 161, and the first interaction token 163 from the memory 176 of the entity server 170 based on the user identity token 162 and the first interaction token 163.

At operation 328, the entity server 170 identifies the second interaction to be completed based on the first interaction token 163 and the instruction token 161.

At operation 330, the entity server 170 conducts the second interaction with the user device 102 associated with the user 101 to complete the interaction session in the real-world environment 140.

At operation 332, in response to completing the second interaction with the user device 102 associated with the user 101 in the real-world environment 140, the entity server 170 generates a second interaction token 164 comprising second interaction data.

At operation 334, the entity server 170 generates a completion token 165 indicating a completeness of the interaction session. The entity server 170 may present the completion token 165 to the user device 102.

At operation 336, the entity server 170 sends the completion token 165 and the second interaction token 164 to the metaverse server 104. In some embodiment, the entity server 170 sends to the metaverse server 104 the session identifier 160, the user identity token 162, the completion token 165, the second interaction token 164, and associations between them.

At operation 338, the metaverse server 104 receives the completion token 165 and the second interaction token 164 from the entity server 170. The completion token 165 and the second interaction token 164 are associated with the session identifier 160 and the user identity token 162.

At operation 340, the metaverse server 104 associates the session identifier 160 with the completion token 165 and the second interaction token 164 generated in the real-world environment 140.

At operation 342, the metaverse server 104 updates a session status indicator 166 to indicate that the interaction session is completed.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a metaverse server in communication with an entity server via a network, the metaverse server configured to:
receive an interaction request from an avatar to initiate an interaction session with an entity within a virtual environment, the interaction request comprising user credentials and a user instruction for the interaction session, wherein the avatar is associated with a user device associated with a user;
generate an instruction token associated with the user instruction and a session identifier associated with the interaction session, wherein the instruction token is associated with the session identifier, wherein the user instruction for the interaction session comprises at least a first interaction and a second interaction based on the user instruction;
verify with an entity that an identity of the avatar is associated with the user to obtain a user identity token from the entity server, wherein the verifying is based at least in part upon the user credentials and a user profile stored in a memory of the entity server;
send the user identity token to the user device to authorize the avatar to interact with the entity;
conduct, based on the user instruction and the user identity token, a virtual interaction indicative of the first interaction between the avatar and the entity in the virtual environment;
generate a first interaction token associated with the first interaction and the session identifier;

send, to the user device, the first interaction token associated with the user identity token and the session identifier;

send, to the entity server, the session identifier, the instruction token, the user identity token, and the first interaction token;

the entity server associated with the entity and configured to:

determine whether the user credentials from the metaverse server match data of the user profile stored in the memory of the entity server;

in response to determining that the user credentials match the data of the user profile stored in the memory of the entity server, send the user identity token to the metaverse server, wherein the user identity token is stored in the memory of the entity server;

receive the user identity token and the first interaction token from the user device associated with the user in a real-world environment;

validate the user identity token from the user device associated with the user by determining whether the user identity token from the user device matches the user identity token stored in the memory of the entity server;

retrieve, from the memory of the entity server based on the user identity token and the first interaction token, the session identifier and the instruction token in response to determining a match;

identify the second interaction to be completed based on the first interaction token and the instruction token; and conduct the second interaction with the user device associated with the user to complete the interaction session in the real-world environment.

2. The system of claim 1, wherein the metaverse server is further configured to:

generate a session status indicator to indicate whether the interaction session is completed;

generate associations between the session identifier, the session status indicator, the user identity token, the instruction token, and the first interaction token; and communicate the associations to the entity server.

3. The system of claim 2, wherein the entity server is further configured to:

validate the session identifier, the instruction token, and the first interaction token received from the metaverse server with the user identity token stored in the memory of the entity server;

confirm with the metaverse server in response to the validating;

store, in the user profile in the memory of the entity server, the session identifier, the instruction token, the user identity token, the first interaction token comprising first interaction data; and store the corresponding associations in the user profile in the memory of the entity server.

4. The system of claim 1, wherein the data of the user profile stored in the memory of the entity server comprises user credentials associated with the user.

5. The system of claim 1, wherein the entity server is further configured to:

in response to completing the second interaction with the user device associated with the user in the real-world environment, generate a second interaction token comprising second interaction data;

generate a completion token indicating a completeness of the interaction session;

present the completion token to the user device; and send, to the metaverse server, the completion token and the second interaction token.

6. The system of claim 5, wherein the metaverse server is further configured to:

receive, from the entity server, the completion token and the second interaction token;

associate the session identifier with the completion token and the second interaction token generated in the real-world environment; and update a session status indicator to indicate that the interaction session is completed.

7. The system of claim 1, wherein the metaverse server is further configured to:

generate blockchain data of the interaction session in a blockchain, the blockchain data comprising the session identifier, the instruction token, the user identity token, a session status indicator, and the first interaction token associated with the virtual interaction of the interaction session conducted in the virtual environment; and update the blockchain data of the interaction session in the blockchain with a completion token and a second interaction token associated with the second interaction of the interaction session conducted in the real-world environment.

8. A method comprising:

receiving, by a metaverse server, an interaction request from an avatar to initiate an interaction session with an entity within a virtual environment, the interaction request comprising user credentials and a user instruction to perform a particular interaction, wherein the avatar is associated with a user device associated with a user;

generating, by the metaverse server, an instruction token associated with the user instruction and a session identifier associated with the interaction session, wherein the instruction token is associated with the session identifier, wherein the user instruction for the interaction session comprises at least a first interaction and a second interaction based on the user instruction;

verifying by the metaverse server with an entity that an identity of the avatar is associated with the user to obtain a user identity token from an entity server, wherein the verifying is based at least in part upon the user credentials and a user profile stored in a memory of the entity server;

determining, by the entity server, whether the user credentials from the metaverse server match data of a user profile stored in the memory of the entity server;

in response to determining that the user credentials match the data of the user profile stored in the memory of the entity server, sending, by the entity server, the user identity token to the metaverse server to validate the identity of the avatar associated with the user, wherein the user identity token is stored in the memory of the entity server;

sending, by the metaverse server, the user identity token to the user device to authorize the avatar to interact with the entity;

conducting, by the metaverse server based on the user instruction and the user identity token, a virtual interaction indicative of the first interaction of the interaction session between the avatar and the entity in the virtual environment;

generating, by the metaverse server, a first interaction token associated with the first interaction;

sending, by the metaverse server to the user device, the first interaction token associated with the user identity token and the session identifier;

sending, by the metaverse server to the entity server, the session identifier, the instruction token, the user identity token, and the first interaction token;

receiving, by the entity server, the user identity token and the first interaction token from the user device associated with the user in a real-world environment;

validating, by the entity server, the user identity token from the user device associated with the user by determining whether the user identity token from the user device matches the user identity token stored in the memory of the entity server;

retrieving, by the entity server from the memory of the entity server based on the user identity token and the first interaction token, the session identifier and the instruction token in response to determine a match;

identifying, by the entity server, the second interaction to be completed based on the first interaction token and the instruction token; and conducting, by the entity server, the second interaction with the user device associated with the user to complete the interaction session in the real-world environment.

9. The method of claim 8, further comprising:

by the metaverse server, generating a session status indicator to indicate whether the interaction session is completed;

generating associations between the session identifier, the session status indicator, the user identity token, the instruction token, and the first interaction token; and communicating the associations to the entity server.

10. The method of claim 9, further comprising:

by the entity server, validating the session identifier, the instruction token, and the first interaction token received from the metaverse server with the user identity token stored in the memory of the entity server;

confirming with the metaverse server in response to the validating by the entity server;

storing in the user profile in the memory of the entity server, the session identifier, the user identity token, the instruction token, the first interaction token comprising first interaction data; and storing the corresponding associations in the user profile in the memory of the entity server.

11. The method of claim 8, wherein the data of the user profile stored in the memory of the entity server comprises user credentials associated with the user.

12. The method of claim 8, further comprising:

by the entity server, in response to completing the second interaction with the user device associated with the user in the real-world environment, generating a second interaction token comprising second interaction data;

generating a completion token indicating a completeness of the interaction session;

presenting the completion token to the user device; and sending, to the metaverse server, the completion token and the second interaction token.

13. The method of claim 12, further comprising:

by the metaverse server, receiving, from the entity server, the completion token and the second interaction token;

associating the session identifier with the completion token and the second interaction token generated in the real-world environment; and updating a session status indicator to indicate that the interaction session is completed.

14. The method of claim 8, further comprising:

by the metaverse server, generating blockchain data of the interaction session in a blockchain, the blockchain data comprising the session identifier, the instruction token, the user identity token, a session status indicator, and the first interaction token associated with the virtual interaction of the interaction session conducted in the virtual environment; and updating the blockchain data of the interaction session in the blockchain with a completion token and a second interaction token associated with the second interaction of the interaction session conducted in the real-world environment.

15. A method comprising:

receiving, by a metaverse server, an interaction request from an avatar to initiate an interaction session with an entity within a virtual environment, the interaction request comprising user credentials and a user instruction to perform a particular interaction, wherein the avatar is associated with a user device associated with a user;

generating, by the metaverse server, an instruction token associated with the user instruction and a session identifier associated with the interaction session, wherein the instruction token is associated with the session identifier, wherein the user instruction for the interaction session comprises at least a first interaction and a second interaction based on the user instruction;

verifying by the metaverse server with an entity that an identity of the avatar is associated with the user to obtain a user identity token from an entity server, wherein the verifying is based at least in part upon the user credentials and a user profile stored in a memory of the entity server;

communicating, by the metaverse server, the user identity token to the user device to authorize the avatar to interact with the entity;

conducting, by the metaverse server, based on the user instruction and the user identity token, a virtual interaction indicative of the first interaction of the interaction session between the avatar and the entity in the virtual environment;

generating, by the metaverse server, a first interaction token associated with the first interaction;

sending, by the metaverse server to the user device, the first interaction token associated with the user identity token and the session identifier;

sending, by the metaverse server to the entity server, the session identifier, the instruction token, the user identity token, and the first interaction token;

receiving, by the entity server, the user identity token and the first interaction token from the user device associated with the user in a real-world environment;

validating, by the entity server, the user identity token from the user device associated with the user by determining whether the user identity token from the user device matches the user identity token stored in the memory of the entity server;

retrieving, from the memory of the entity server based on the user identity token and the first interaction token, the session identifier and the instruction token in response to determine a match;

by the entity server,
identifying the second interaction to be completed based on the first interaction token and the instruction token; and
conducting the second interaction with the user device associated with the user to complete the interaction session in the real-world environment.

16. The method of claim 15, further comprising:
by the metaverse server,
generating a session status indicator to indicate whether the interaction session is completed;
generating associations between the session identifier, the session status indicator, the user identity token, the instruction token, and the first interaction token; and
communicating the associations to the entity server.

17. The method of claim 16, further comprising:
by the entity server,
validating the session identifier, the instruction token, and the first interaction token received from the metaverse server with the user identity token stored in the memory of the entity server;
confirming with the metaverse server in response to the validating;
storing, in the user profile in the memory of the entity server, the session identifier, the user identity token, the instruction token, the first interaction token comprising first interaction data;
storing the corresponding associations in the user profile in the memory of the entity server;
in response to completing the second interaction with the user device associated with the user in the real-world environment, generating a second interaction token comprising second interaction data;
generating a completion token indicating a completeness of the interaction session;
presenting the completion token to the user device; and
sending, to the metaverse server, the completion token and the second interaction token.

18. The method of claim 15, further comprising:
by the entity server,
determining whether the user credentials from the metaverse server match data of a user profile stored in the memory of the entity server; and
in response to determining that the user credentials match the data of the user profile stored in the memory of the entity server, sending the user identity token to the metaverse server to validate the identity of the avatar associated with the user, wherein the user identity token is stored in the memory of the entity server,
wherein the data of the user profile stored in the memory of the entity server comprises user credentials associated with the user.

19. The method of claim 18, further comprising:
by the metaverse server,
receiving the completion token and the second interaction token from the entity server;
associating the session identifier with the completion token and the second interaction token generated in the real-world environment; and
updating a session status indicator to indicate that the interaction session is completed.

20. The method of claim 15, further comprising:
by the metaverse server,
generating blockchain data of the interaction session in a blockchain, the blockchain data comprising the session identifier, the instruction token, the user identity token, a session status indicator, and the first interaction token associated with the virtual interaction of the interaction session conducted in the virtual environment; and
updating the blockchain data of the interaction session in the blockchain with a completion token and a second interaction token associated with the second interaction of the interaction session conducted in the real-world environment.

* * * * *